United States Patent [19]

Schoettle

[11] Patent Number: 4,793,484
[45] Date of Patent: Dec. 27, 1988

[54] BOX-SHAPED CONTAINER FOR ARTICLES

[75] Inventor: Klaus Schoettle, Heidelberg, Fed. Rep. of Germany

[73] Assignee: BASF Aktiengesellschaft, Ludwigshafen, Fed. Rep. of Germany

[21] Appl. No.: 925,213

[22] Filed: Oct. 31, 1986

[30] Foreign Application Priority Data

Nov. 6, 1985 [DE] Fed. Rep. of Germany ... 8531274[U]

[51] Int. Cl.⁴ ............................................. B65D 85/672
[52] U.S. Cl. ................................ 206/387; 220/338; 220/335; 16/341
[58] Field of Search ................ 206/307, 387; 220/337, 220/338, 343, 335; 16/224, 337, 303, 387, 317, 297, 341, 342; D8/323

[56] References Cited

U.S. PATENT DOCUMENTS

| | | | |
|---|---|---|---|
| 898,005 | 8/1908 | Rodler | 16/316 |
| 1,182,515 | 5/1916 | Viragh | 16/341 |
| 3,754,639 | 8/1973 | Gellert | 206/387 |
| 3,984,028 | 10/1976 | Zinnbauer | 220/337 |
| 4,193,164 | 3/1980 | Okayama | 220/335 |
| 4,378,066 | 3/1983 | Sato et al. | 206/387 |
| 4,527,690 | 7/1985 | Schmidts et al. | 206/387 |
| 4,540,090 | 9/1985 | Gelardi et al. | 206/387 |
| 4,646,916 | 3/1987 | Ishida et al. | 206/387 |
| 4,658,547 | 4/1987 | Oboza | 16/341 |
| 4,666,036 | 5/1987 | Bourbon | 220/337 |
| 4,707,813 | 11/1987 | Schneider et al. | 206/387 |

FOREIGN PATENT DOCUMENTS

| | | | |
|---|---|---|---|
| 2366195 | 7/1978 | Fed. Rep. of Germany . | |
| 7834754 | 5/1979 | Fed. Rep. of Germany . | |
| 3129559 | 8/1982 | Fed. Rep. of Germany . | |
| 13222 | of 1907 | United Kingdom | 16/341 |
| 1357512 | 6/1974 | United Kingdom | 43/16 |
| 2101096 | 1/1983 | United Kingdom | 206/38 |

Primary Examiner—David T. Fidei
Attorney, Agent, or Firm—Keil & Weinkauf

[57] ABSTRACT

A box-shaped container for articles, consisting of a bottom part and a lid part, each having side walls, possessess on the side walls joint and rotation-restricting means which consist of one or more joint projections having an oblique surface and a hole having one or more bottom relief surfaces falling away on two sides. In an embodiment having a joint projection in the shape of a frying pan and one or more trapezoidal grooves arranged in a hole in such a way that their position is rotated, automatic closing and opening of the container can be achieved. The container is primarily intended for storing/archiving essentially right parallelepiped recording media, for example audio, video or data cassettes, but other articles too, for example jewelry etc., can advantageously be stored in such containers and protected from damage and dirt.

9 Claims, 3 Drawing Sheets

BOX-SHAPED CONTAINER FOR ARTICLES

BACKGROUND OF THE INVENTION AND PRIOR ART

The present invention relates to a box-shaped container for articles, in particular recording media, the container being of the kind comprising a bottom part having a rear wall, a base wall and side walls, a lid part having at least one lid wall and lid side walls, at least slight initial tension being present between the lid side walls and the side walls of the bottom part, and joint and rotation-restricting means provided on said side walls.

German Published Application DAS No. 2,366,195 discloses a container, for audio tape cassettes, in which the lid part possesses a pocket for holding the cassette and the bottom part possesses a cutout corresponding to the front of the pocket, in order to form a closed, box-shaped housing in the closed condition of the container. The lid and bottom parts are connected via primitive pin/hole joints, and projections on the lid part restrict rotation of the lid to about 180°. Because of the flexibility of the free side walls and of the bottom part and the dimensions of the projections, restriction of rotation in the container in practice is present only to a very limited extent, since the projections can be overcome easily and even unintentionally, so that the cassette cannot effectively be prevented from falling out.

German Utility Model No. 7,834,754 discloses a swivel container for two or more recording media, a box-shaped one in a card compartment on the lid and a cassette-shaped one in a separate tray on the bottom of the container. To connect the bottom tray to the lid, hinge flaps having depressions, provided on the lid, engage stub axles on the outsides of the side parts of the tray. The opening angle is restricted to about 130° by the rear upper edge of the lid coming into contact with the front edge of the bottom.

German Laid-Open Application DOS No. 3,129,559 discloses a cassette container which possesses pin/hole joints and circular projections which do not overlap and together give an arc of less than 360°. The ends of the annular sectors come into contact with one another after a predetermined rotation distance and restrict the opening angle of the container to, for example, 90°.

In each of the above described embodiments the joint means and rotationrestricting means are two separate devices.

OBJECT AND SUMMARY OF THE INVENTION

It is an object of the present invention to provide a container possessing improved combined joint and rotation-restricting means.

We have found that this object is achieved, according to the invention, if there is provided a box-shaped container of the kind referred to wherein the joint and rotation-restricting means are in the form of a unit on each side of the container, each unit comprising a joint projection with one or more oblique surfaces and a recess with at least one bottom relief surface falling away on two sides.

Surprisingly, this provides, by means of a very advantageous modification of conventional joint means, a reliably functioning and simply produced joint and rotation-restricting means in the form of a unit.

The invention can be applied to a container whose bottom wall has a cutout which is bordered on two sides by side walls of the bottom part, and in which a pocket which fits into the cutout contour and has side walls is provided on the lid part, if the unit comprising the joint means and the rotation-restricting means is provided between the side walls of the bottom part and the side walls of the pocket.

In an advantageous embodiment, the joint projection is in the form of a pin with an oblique surface, e.g. an end surface oblique to the pivoting axis.

In another embodiment, the joint projection and one or more appropriate grooves in the side walls have a prismatic shape, permitting particularly simple production.

In another advantageous embodiment of the invention, the joint projection is in the form of a pin and the oblique surface extends from the end of the pin to the side wall surface and, in particularl, forms an angle of from 8°–45° with the side wall surface.

In practice, it is advantageous if two oblique surfaces which form a roof or ridge shape are provided in the (joint) recess and, in particular, the ridge part of the roof shape is matched by a transverse pin. The prismatic groove and the corresponding projection may furthermore have a trapezoidal cross-section.

In another embodiment, the joint projection, in plan, can be in the form of a frying pan, the pan part possessing the oblique surface and the hole containing, as a bottom relief, three grooves arranged in the shape of a star and having a trapezoidal cross-section.

The projection in the shape of a frying pan is usually arranged therein with the handle part parallel to the end of the lid side wall part, and one of the corresponding grooves in the hole is provided in the same direction. If one of the grooves is provided in a position rotated by an angle of from 20° to 15° with respect to the normal position of the handle part, surprisingly, without changing the embodiment and arrangement of the handle part, simply by rotating the grooves, an initial tension is obtained between the bottom and lid parts which permits a snap effect to be achieved between the said parts. The initial tensile force is advantageously from 0.05–0.5 N.

BRIEF DESCRIPTION OF THE DRAWINGS

Embodiments of the invention will now be described, by way of example, with reference to the accompanying drawings, in which.

BRIEF DESCRIPTION OF THE PREFERRED EMBODIMENTS

Figure 1:
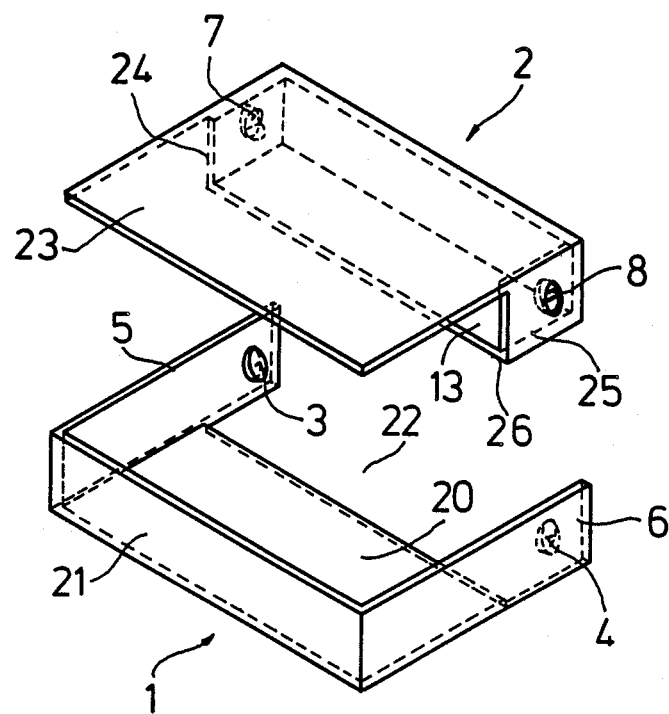
FIG. 1 shows a two-part cassette container having a joint and rotation-restricting means as a unit according to the invention.

The container in FIG. 1 consists of a bottom part 1 having a base wall 20, a rear wall 21, side walls 5 and 6 and a base wall cutout 22, and a lid part 2 having a lid wall 23 and a pocket 13 which has side walls 24 and 25 and a pocket front wall 26 which fits into the cutout 22. The joint projections of the joint and rotation-restricting means in the form of a unit comprise pivot pins 3 and 4 which have oblique surfaces and are provided on the inside of the free ends of the side walls 5 and 6 and whose oblique surface 10 falls off to the level of the particular side wall surfaces. The angle gamma ($\gamma$) should be from about 8°–45°, preferably from about 10°–25°. The outer pocket side walls 24 and 25 contain, as a further part of the unit, blind recesses or holes 7 and 8 whose bottom relief surfaces fall off on two sides and, in this embodiment, have a roof shape 9, this roof being formed by the two planar, oppositely inclined relief surfaces 11 and 12 which intersect in roof ridge 9. The angles of inclination of the roof shape are about the same as the angle of inclination gamma of the surfaces 10 of the pins 3 and 4. The distance between the free ends of the pins 3 and 4 of the bottom part 1 is chosen to be somewhat smaller than that between the base of the blind holes 7 and 8 in the lid part 2, so that an initial tension holds parts 1 and 2 together at the joint. This initial tension is caused by the side walls 5, 6 being sprung apart and resiliently urging the pins 3, 4 into their respective recesses 7, 8. When the container is assembled and closed, the oblique surface 10 of the pin 3 comes to rest on the bottom relief surface, in particular on the roof surface 11 of the blind recess 7, and thus locks the bottom and lid parts in a defined position with respect to one another.

Figure 2:
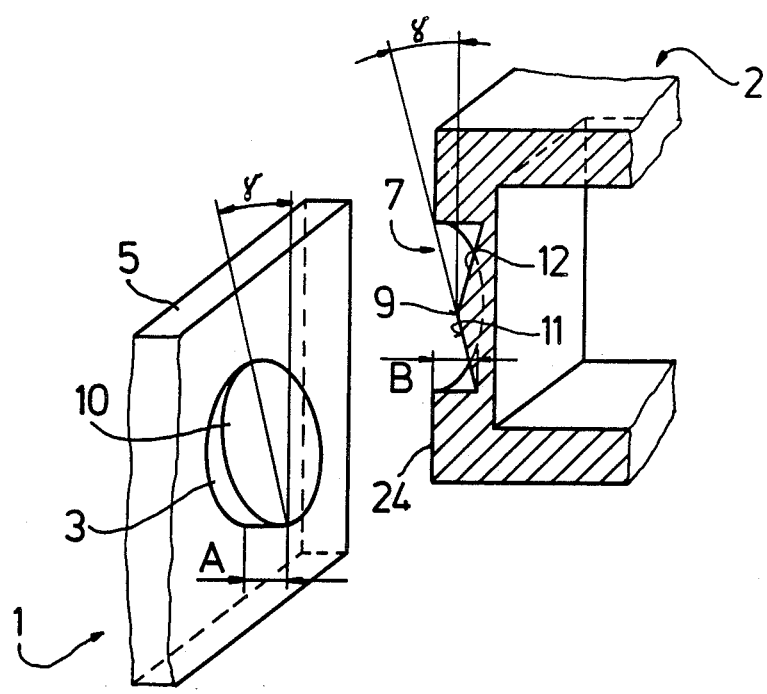
FIG. 2 shows details of the joint and rotation-restricting means which is in the form of a unit and is shown in FIG. 1.

When the container is opened, the lid part 2 is rotated with respect to the bottom part 1. The oblique surface 10 slides over the roof surface 11, over the roof ridge 9 and eventually comes to rest on the roof surface 12 in a 180° open position and snaps tight in this position thereby, in effect, limiting the angle of rotation to 180° The surface 10 of the pin 3 and the surfaces 11 and 12 of the recess 7 which intersect in roof ridge 9 act as camming surfaces during pivoting of the pin 3 which control the degree of penetration of the pin within the recess 7. By varying the angles and arrangement of the roof surfaces with respect to one another, it is also possible to achieve other swivel angles. For example, instead of the two roof surfaces 11,12 shown in FIG. 2 which intersect in a single ridge 9 it would also be possible to provide three roof surfaces intersecting in three ridges which are angularly displaced by 1120° from each other. In this case the rotation of the joint would be restricted in accordance with the corresponding three 120° displaced rest positions. The angle $\gamma$ in each case will be chosen so as to provide the most appropriate camming and locking forces. Such containers are of course also suitable for other applications, for example in the packaging industry generally, or for jewelry containers, etc.

When mounting the lid part 2 on the bottom part 1, the pocket side walls 24 and 25 of the former are pushed downward over the oblique surfaces 10 or pins 3 and 4 until the said pins engage the blind recesses or holes 7 and 8 or until the oblique surfaces 10 come to rest on the lower roof surfaces 11 of the roof shape. This permits simple, easy assembly although there is a danger that the free ends of the side walls 5 and 6 of the bottom part may break off and hence make one or more container parts useless.

To prevent the side walls 5 and 6 of the bottom part 1 and the pocket side walls 24 and 25 of the lid part 2 from rubbing against each other and hence producing abrasion material which is harmful to any cassettes stored in the container, it is advantageous to choose the pin height A above the surface of the side wall 5 to be slightly greater than the depth B of the particular blind recess.

Figure 3:
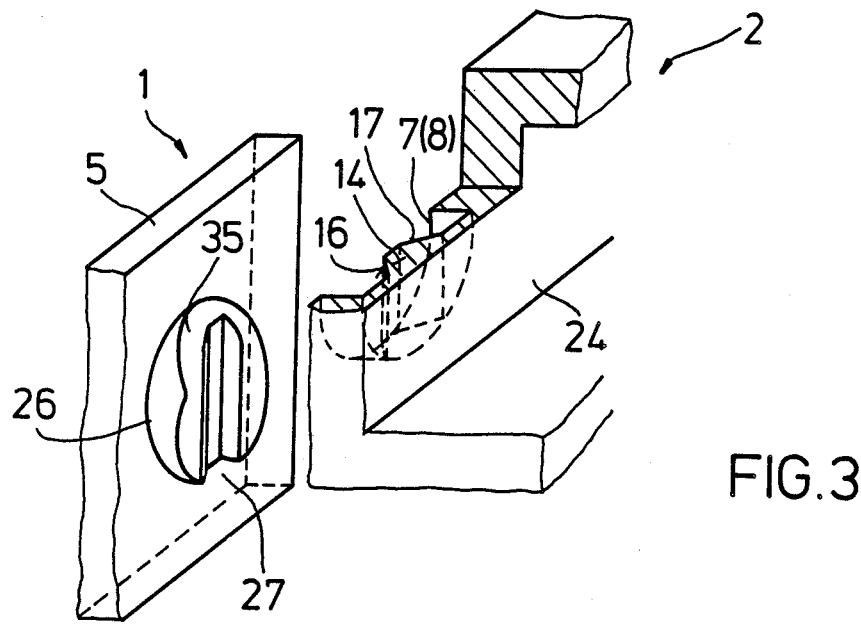
FIG. 3 shows a variant of a joint and rotation-restricting means in the form of a unit, and FIGS. 4 and 5 each show a further variant of a joint and rotation-restricting means having a star groove opening, in the form of a unit.
Figure 4:
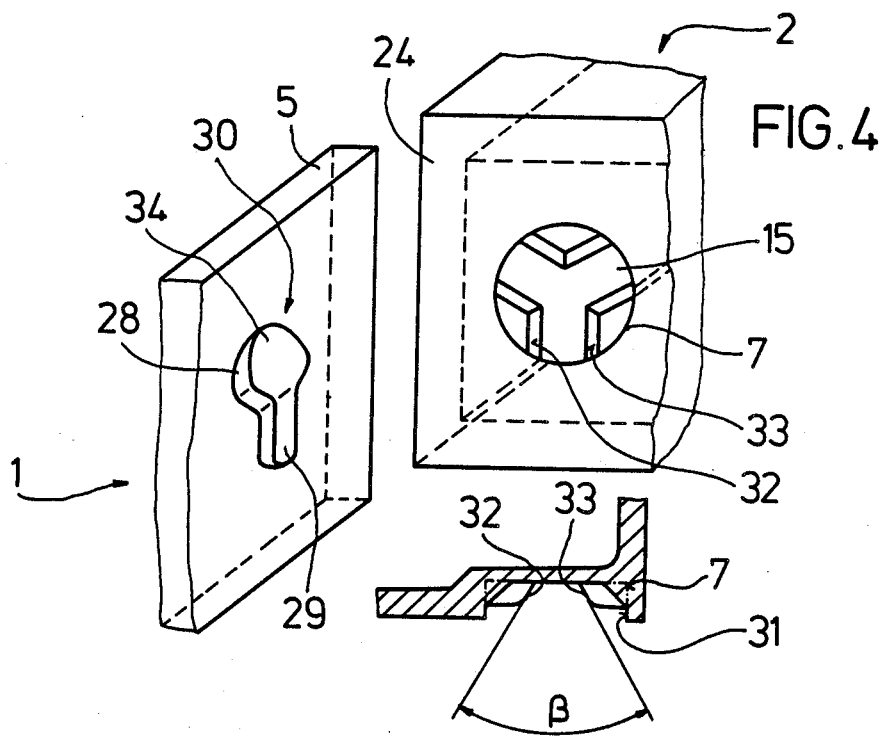

FIGS. 3 and 4 show variants of the novel container. The joint and rotation-restricting means in the embodiments of FIGS. 3 and 4, which are in the form of a unit, have been modified relative to the same container shown in FIG. 1.

In FIG. 3, an approximately cylindrical pin 26 having an oblique surface 35 on one side is provided with a groove 27 which has a trapezoidal cross-section and is arranged at right angles to the base surface of the cylindrical pin 26. After assembly, an appropriately arranged and shaped rib or web 14 having oblique surfaces 16, 17 as a bottom relief in the blind recess 7 or 8 engages this groove 27. This solution has the advantage of a stronger locking action in the open or closed container. In the embodiment shown in FIG. 3, the rotation is restricted to 180°. Of course, any desired rotation restriction can be achieved by appropriate modification of the pin/blind recess arrangement and embodiment.

In FIG. 4, for reasons of clarity, the lid part 2 has been rotated through 90° with respect to the bottom part 1, so that the view shown is one which looks onto the blind hole 7 which has grooves 15 which possess a trapezoidal cross-section (oblique surfaces 32, 33) and in this case are arranged in the form of a (three-pointed) star. The joint projection 30 has a frying pan shape and engages one of these grooves 15, the handle 29 being trapezoidal and the pan part 28 being roughly cylindrical with an oblique surface 34. In the arrangement of the grooves 15 in FIG. 4, the joint projection 30 can lock into three different angular positions, at 0°, 120°, and 240°, if the zero degree line runs parallel to the vertical edge of the lid part 2. By choosing other appropriate arrangements, it is also possible to achieve locking positions at other angles and/or a smaller or larger number of locking positions.

To prevent the pan part 28 of the joint projection 30 from springing out of the blind hole 7, 8 during rotation, the said blind recess possesses at its entrance a cylindrical edge 31, and the depth of the edge 31 is preferably up to about one third of the total depth of the blind hole 7, 8.

Figure 5:
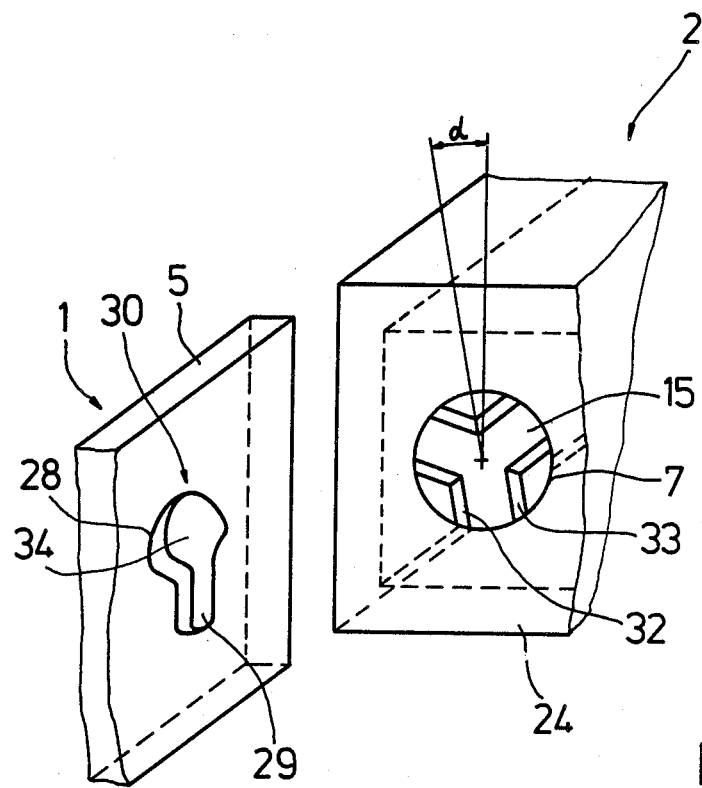

FIG. 5 shows a modification of the embodiment according to FIG. 4, in which the star-shaped grooves 15 in the lid part 2 are arranged rotated through an angle alpha ($\alpha$) of from about 5°–25°, preferably from about 5°–15°, with respect to the axis of the handle 29 of the joint projection. Of course, the pan handle may also be arranged so that it is rotated through an angle with respect to the groove. To achieve the self-closing action, the grooves must be rotated in the opposite direction to the closing direction of the lid part.

In the embodiment of FIG. 5, the lid part 2 closes automatically in the process of closing the container, starting from an opening angle which is dependent on the angle alpha ($\alpha$) and on the lateral angle of the grooves or webs and the thickness of the wall 5, after which the bottom and lid parts are held together with a retaining force of from 0.05–0.5 N, preferably from 0.3–0.5 N.

A retaining force of 0.30 N is obtained, for example, if the angle of rotation alpha ($\alpha$) of the grooves 15 is about 10° and the trapezoidal angle beta ($\beta$) of each groove (angle between oblique surfaces 32 and 33) is about 60°. In this case, the automatic closing movement begins at about 30° to 40° for a wall thickness of about 1.2 mm and polystyrene material.

Furthermore, automatic opening of the container can be achieved with the reverse arrangement of the frying pan projection 16 and the star shape of the grooves 15.

The invention can be used for any type of container as defined in the preamble of the claim, regardless of whether side flaps of one part and of the other part or side walls themselves or side flaps on the one hand and side walls on the other hand together hold the joint and rotation-restricting means in the form of a unit. For cassettes, the invention can be applied to the conventional cassette box, which is also referred to commercially as a snap pack. The name snap pack is not associated with an automatic snap-shut action and nor is this achieved in practice. The expression can more readily be interpreted as meaning that the cassette can be stored in the cassette pocket and the latter can be locked using the remaining container, although the snap-shut movement must always be effected manually. Suitable materials for the container according to the invention are virtually all plastics which can be processed by a thermoplastic method, for example polystyrene, polyacetals, polycarbonates, etc. and their copolymers. Examples of suitable production processes are injection molding and deep drawing.

I claim:

1. A box-shaped container for articles, in particular recording media, comprising a bottom part having a rear wall, a base wall and side walls, a lid part having at least one lid wall and lid side walls, at least slight initial tension being present between the lid side walls and the side walls of the bottom part, and joint means and rotation-restricting means provided on said side walls, wherein the joint means and rotation-restricting means are in the form of a unit on each side of the container, wherein said unit consists of a joint projection having a free end and a recess therefor having a bottom and wherein said free end comprises an oblique surface which oblique surface forms an angle gamma of from 8° to 45° with the side wall surface from which the said joint projection extends and said bottom in said recess is provided with two oppositely inclined bottom relief surfaces intersecting in a ridge and falling away on the two sides of said ridge, said two oppositely inclined relief surfaces forming approximately the same angle gamma of inclination of from 8° to 45° with the side wall surface in which the said recess is located.

2. A box-shaped container for articles, in particular recording media, comprising
   a bottom part having a rear wall, a base wall and side walls,
   a lid part having at least one base wall and lid side walls, and
   axially aligned joint means on each side of said container, each said joint means including a pivot pin in the corresponding side wall of one of said two parts and a recess in the corresponding side wall of the other part, and
   said pivot pin having at its free end one or more first camming surfaces designed to act axially of said joint means and said recess having at its bottom one or more second camming surfaces designed to act axially of said joint means and cooperating with said first camming surfaces so as to provide two or more rest positions for the pivoting of said lid part relatively to said bottom part and to correspondingly restrict the relative rotation between said two parts,
   the side walls of the bottom part being slightly pretensioned against the side walls of the lid part to insure camming engagement between the cooperating camming surfaces in a direction axially of said joint means.

3. A container as claimed in claim 1, wherein each joint projection is in the form of a pin having an oblique surface which slopes from the end of the pin to the side wall surface from which it projects.

4. A container as claimed in claim 1, wherein two oblique surfaces are provided in each recess and define a ridge.

5. A container as claimed in claim 1, wherein a prismatic groove is formed in each joint projection for receiving a correspondingly shaped rib in the recess, the rib and recess each having a trapezoidal cross-section.

6. A container as claimed in claim 1, wherein the joint projection in plan has a frying pan shape, and the recess comprises three grooves arranged in the shape of a star, having a trapezoidal cross-section and providing a bottom relief form in the recess.

7. A container as claimed in claim 6, wherein the joint projection in the form of a frying pan is arranged with a handle part parallel to the end of the lid side wall, and one of the corresponding grooves in the recess is provided in the same direction.

8. A container as claimed in claim 7, wherein one of the grooves is provided in a position rotated through an angle alpha of from 5° to 15° with respect to the position of the handle part.

9. A container as claimed in claim 1, wherein the unit is held together by an initial tensile force of from 0.05–0.5 N.

* * * * *